United States Patent
Yamane et al.

(10) Patent No.: US 12,523,697 B2
(45) Date of Patent: Jan. 13, 2026

(54) STICKING DIAGNOSIS APPARATUS AND STICKING DIAGNOSIS METHOD

(71) Applicant: Isuzu Motors Limited, Yokohama (JP)

(72) Inventors: Futoshi Yamane, Fujisawa (JP); Takuya Kikuchi, Fujisawa (JP); Kenta Kameda, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 89 days.

(21) Appl. No.: 18/124,599

(22) Filed: Mar. 22, 2023

(65) Prior Publication Data

US 2023/0305059 A1   Sep. 28, 2023

(30) Foreign Application Priority Data

Mar. 24, 2022 (JP) .................. 2022-048954

(51) Int. Cl.
  *G01R 31/327*  (2006.01)
  *B60L 3/00*   (2019.01)
  *H01M 10/42*  (2006.01)

(52) U.S. Cl.
  CPC ..... *G01R 31/3275* (2013.01); *G01R 31/3278* (2013.01); *H01M 10/425* (2013.01); *B60L 3/0046* (2013.01)

(58) Field of Classification Search
  CPC ........... G01R 31/3275; G01R 31/3278; H01M 10/425
  USPC ............................................. 324/418–424
  See application file for complete search history.

(56) References Cited

U.S. PATENT DOCUMENTS

| 12,203,987 B2 * | 1/2025 | Park | G01R 31/3842 |
| 2013/0257440 A1 * | 10/2013 | Takahashi | H02J 7/0034 |
| | | | 324/418 |
| 2019/0123568 A1 * | 4/2019 | Kaneko | H02J 7/0013 |
| 2023/0099667 A1 * | 3/2023 | Park | G01R 31/3272 |
| | | | 324/418 |

FOREIGN PATENT DOCUMENTS

| JP | 2011-015567 | 1/2011 |
| JP | 2013-206643 | 10/2013 |
| JP | 2019-221022 | 12/2019 |

* cited by examiner

*Primary Examiner* — Akm Zakaria

(57) ABSTRACT

A sticking diagnosis apparatus for diagnosing a presence of sticking at a positive-electrode relay and at a negative-electrode relay, the sticking diagnosis apparatus including an obtaining section that obtains, a first voltage value that is a voltage between a point downstream of the positive-electrode relay and a point upstream of the negative-electrode relay and a second voltage value that is a voltage of a diagnosis circuit provided in parallel to the negative-electrode relay; a determination section that when the first voltage value is greater than or equal to a first threshold, determines that the positive-electrode relay is in a state in which the positive-electrode relay remains in the closed state, and when the second voltage value is less than or equal to a second threshold, determines that the negative-electrode relay is in a state in which the negative-electrode relay remains in the closed state.

5 Claims, 5 Drawing Sheets

STICKING DIAGNOSIS APPARATUS AND STICKING DIAGNOSIS METHOD

CROSS REFERENCE TO RELATED APPLICATIONS

This application claims the benefit of priority of Japanese Patent Application No. 2022-048954, filed on Mar. 24, 2022, the disclosure of which including the specification, drawings and abstract is incorporated herein by reference in its entirety.

TECHNICAL FIELD

The present disclosure relates to a sticking diagnosis apparatus and a sticking diagnosis method for diagnosing the presence or absence of sticking of relays that are connected to a battery.

BACKGROUND ART

In the related art, a configuration including a battery that is chargeable and dischargeable, a load to which electric power is supplied from the battery, a positive-electrode relay (hereinafter referred to as "P relay") that connects the positive electrode of the battery and the load so as to be disconnectable, and a negative-electrode relay (hereinafter referred to as "N relay") that connects the negative electrode of the battery and the load so as to be disconnectable is known (see, for example, PTL 1).

A method for diagnosing (in other words, determining or detecting) the presence or absence of sticking at each of the P relay and the N relay in the above-described configuration is also known.

For example, to diagnose the presence or absence of sticking of the P relay, in a state in which the P relay is turned OFF (the contact is put in an open state) and the N relay is turned ON (the contact is put in a closed state), the voltage between a point downstream of the P relay and a point downstream of the N relay is detected, and when the voltage is higher than or equal to a threshold, the P relay is diagnosed as having welding occurring therein.

To diagnose the presence or absence of sticking of the N relay, in a state in which the N relay is turned OFF (the contact is put in the open state) and the P relay is turned ON (the contact is put in the closed state), the voltage between a point downstream of the P relay and a point downstream of the N relay is detected, and when the voltage is higher than or equal to a threshold, the N relay is diagnosed as having welding occurring therein.

CITATION LIST

Patent Literature

PTL 1
Japanese Patent Application Laid-Open No. 2019-221022

SUMMARY OF INVENTION

Technical Problem

However, with the above-described method in the related art, the P relay and the N relay need to be alternately turned ON and OFF, and this switching operation takes time. Further, when both the P relay and the N relay are turned ON, a malfunction may occur, and therefore, a sufficient time needs to be taken to switch between ON and OFF in order to prevent such a malfunction.

Therefore, the method in the related art has an issue that a diagnosis of sticking of relays takes time.

An object of one aspect of the present disclosure is to provide a sticking diagnosis apparatus and a sticking diagnosis method with which the time taken to make a diagnosis of sticking of relays can be reduced.

Solution to Problem

A sticking diagnosis apparatus according an aspect of the present disclosure is an apparatus for diagnosing a presence or absence of sticking at a positive-electrode relay that is connected to a positive electrode of a battery and at a negative-electrode relay that is connected to a negative electrode of the battery, the sticking diagnosis apparatus including: an obtaining section that obtains, before both a contact of the positive-electrode relay and a contact of the negative-electrode relay are put in a closed state, a first voltage value that is a value of a voltage between a point downstream of the positive-electrode relay and a point upstream of the negative-electrode relay and a second voltage value that is a value of a voltage of a diagnosis circuit provided in parallel to the negative-electrode relay; and a determination section that when the first voltage value is greater than or equal to a first threshold, determines that the positive-electrode relay is in a state in which the contact of the positive-electrode relay remains in the closed state and is not capable of transitioning to an open state, and when the second voltage value is less than or equal to a second threshold, determines that the negative-electrode relay is in a state in which the contact of the negative-electrode relay remains in the closed state and is not capable of transitioning to the open state.

A sticking diagnosis method according an aspect of the present disclosure is a method performed by a computer for diagnosing a presence or absence of sticking at a positive-electrode relay that is connected to a positive electrode of a battery and at a negative-electrode relay that is connected to a negative electrode of the battery, the sticking diagnosis method including: obtaining, before both a contact of the positive-electrode relay and a contact of the negative-electrode relay are put in a closed state, a first voltage value that is a value of a voltage between a point downstream of the positive-electrode relay and a point upstream of the negative-electrode relay and a second voltage value that is a value of a voltage of a diagnosis circuit provided in parallel to the negative-electrode relay; and determining when the first voltage value is greater than or equal to a first threshold, that the positive-electrode relay is in a state in which the contact of the positive-electrode relay remains in the closed state and is not capable of transitioning to an open state, and determining when the second voltage value is less than or equal to a second threshold, that the negative-electrode relay is in a state in which the contact of the negative-electrode relay remains in the closed state and is not capable of transitioning to the open state.

Advantageous Effects of Invention

According to the present disclosure, the time taken to make a diagnosis of sticking of relays can be reduced.

DESCRIPTION OF EMBODIMENTS

Hereinafter, an embodiment of the present disclosure will be described with reference to the drawings.

Figure 1:
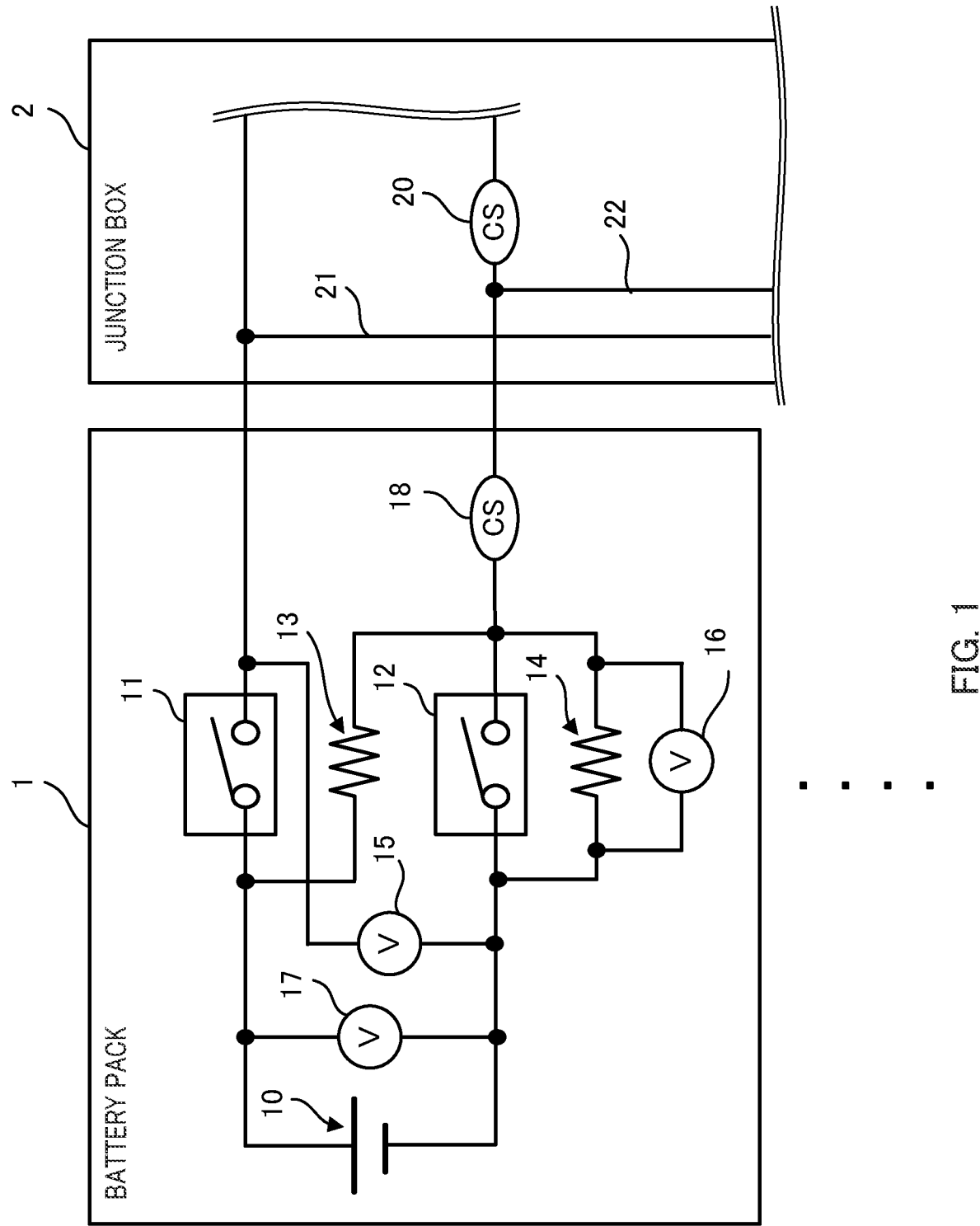
FIG. 1 is a schematic diagram illustrating a configuration of a battery pack according to an embodiment of the present disclosure.

First, a configuration of battery pack 1 according to this embodiment will be described with reference to FIG. 1. FIG. 1 is a schematic diagram illustrating an example configuration of battery pack 1.

As illustrated in FIG. 1, battery pack 1 includes battery 10, P relay (positive-electrode relay) 11, N relay (negative-electrode relay) 12, resistors 13 and 14, voltmeters 15, 16, and 17, and current sensor 18.

Battery 10 is a secondary battery that is chargeable and dischargeable. While battery 10 can be, for example, a nickel-hydrogen battery, a lithium-ion battery, or an all-solid-state battery, battery 10 is not limited to these. While FIG. 1 illustrates a case where one battery 10 is provided in battery pack 1, a plurality of batteries 10 may be provided.

P relay 11 is a high-voltage relay that has one end connected to the positive electrode of battery 10 by an electric wiring line (the reference numeral is omitted) and the other end connected to junction box 2 by an electric wiring line (the reference numeral is omitted).

N relay 12 is a high-voltage relay that has one end connected to the negative electrode of battery 10 by an electric wiring line (the reference numeral is omitted) and the other end connected to junction box 2 by an electric wiring line (the reference numeral is omitted).

In this specification, a relay in which the contact is in an open state is referred to as being turned "OFF", and a relay in which the contact is in a closed state is referred to as being turned "ON". FIG. 1 illustrates an example where both P relay 11 and N relay 12 are turned OFF (their contacts are in the open state).

Resistor 13 is a resistor that has one end connected to a point upstream of P relay 11 by an electric wiring line (the reference numeral is omitted) and the other end connected to a point downstream of N relay 12 by an electric wiring line (the reference numeral is omitted).

Resistor 14 (which is an example of a diagnosis circuit) is a resistor that has one end connected to a point upstream of N relay 12 by an electric wiring line (the reference numeral is omitted) and the other end connected to the point downstream of N relay 12 by an electric wiring line (the reference numeral is omitted). That is, resistor 14 is provided parallel to N relay 12.

Voltmeter 15 is a meter that has one end connected to a point downstream of P relay 11 by an electric wiring line (the reference numeral is omitted) and the other end connected to a point upstream of N relay 12 by an electric wiring line (the reference numeral is omitted). Although not illustrated, voltmeter 15 is electrically connected to sticking diagnosis apparatus 100 (see FIG. 2) described below.

Voltmeter 15 detects the value of the voltage between the point downstream of P relay 11 and the point upstream of N relay 12 (which is an example of a first voltage value) and communicates the voltage value to sticking diagnosis apparatus 100. The voltage value detected by voltmeter 15 is hereinafter referred to as "detected voltage Va".

Voltmeter 16 is a meter that has one end connected to a point upstream of resistor 14 by an electric wiring line (the reference numeral is omitted) and the other end connected to a point downstream of resistor 14 by an electric wiring line (the reference numeral is omitted). Although not illustrated, voltmeter 16 is electrically connected to sticking diagnosis apparatus 100 (see FIG. 2) described below.

Voltmeter 16 detects the value of the voltage of resistor 14 (which is an example of a second voltage value) and communicates the voltage value to sticking diagnosis apparatus 100. The voltage value detected by voltmeter 16 is hereinafter referred to as "detected voltage Vb".

Voltmeter 17 is a meter that has one end connected to a point upstream of P relay 11 by an electric wiring line (the reference numeral is omitted) and the other end connected to a point upstream of N relay 12 by an electric wiring line (the reference numeral is omitted). Although not illustrated, voltmeter 17 is electrically connected to sticking diagnosis apparatus 100 (see FIG. 2) described below.

Voltmeter 17 detects the value of the voltage of battery 10 (which is an example of a third voltage value) and communicates the voltage value to sticking diagnosis apparatus 100. The voltage value detected by voltmeter 17 is hereinafter referred to as "detected voltage Vc".

Current sensor 18 is a meter that has one end connected to the point downstream of N relay 12 by an electric wiring line (the reference numeral is omitted) and the other end connected to junction box 2 by an electric wiring line (the reference numeral is omitted). Although not illustrated, current sensor 18 is electrically connected to sticking diagnosis apparatus 100 (see FIG. 2) described below.

Current sensor 18 detects the value of the current flowing inside battery pack 1 (which is an example of a first current value) and communicates the current value to sticking diagnosis apparatus 100. The current value detected by current sensor 18 is hereinafter referred to as "detected current Ia".

Although not illustrated in FIG. 1, a plurality of battery packs 1 are connected in parallel by one junction box 2. Specifically, the point downstream of P relay 11 of each of the other battery packs 1 not illustrated is connected to electric wiring line 21 of junction box 2, and the point downstream of N relay 12 of each of the other battery packs 1 not illustrated is connected to electric wiring line 22 of junction box 2.

In junction box 2, current sensor 20 is provided. Although not illustrated, current sensor 20 is electrically connected to sticking diagnosis apparatus 100 (see FIG. 2) described below.

Current sensor 20 detects the value of the current flowing inside junction box 2 (which is an example of a second current value and is the value of the current flowing outside battery pack 1) and communicates the current value to sticking diagnosis apparatus 100. The current value detected by current sensor 20 is hereinafter referred to as "detected current Ib".

Battery packs 1 and junction box 2 described above are mounted in a vehicle (for example, an electric car). Battery packs 1 are used as, for example, a power source of the vehicle (a supply source of supplying electric power to a motor for traveling not illustrated). While an example case where battery packs 1 are connected to junction box 2 has been described in this embodiment, junction box 2 is not an essential constituent element.

The configuration of battery pack 1 has been described above.

Figure 2:
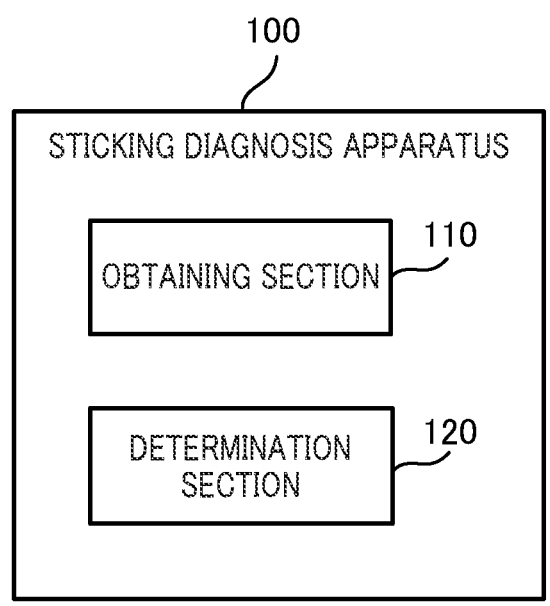
FIG. 2 is a block diagram illustrating a configuration of a sticking diagnosis apparatus according to the embodiment of the present disclosure.

Next, a configuration of sticking diagnosis apparatus 100 according to this embodiment will be described with reference to FIG. 2. FIG. 2 is a block diagram illustrating an example configuration of sticking diagnosis apparatus 100.

Sticking diagnosis apparatus 100 is an apparatus that diagnoses the presence or absence of sticking at P relay 11 and N relay 12. Specifically, sticking diagnosis apparatus 100 performs a stuck ON diagnosis method and a stuck OFF diagnosis method (both are examples of the sticking diagnosis method).

The stuck ON diagnosis method is a method for diagnosing the occurrence of a state (hereinafter referred to as "stuck ON state") in which the contact remains in the closed state (ON) and is not capable of transitioning to the open state (OFF), in each of P relay 11 and N relay 12.

The stuck OFF diagnosis method is a method for diagnosing the occurrence of a state (hereinafter referred to as "stuck OFF state") in which the contact remains in the open state (OFF) and is not capable of transitioning to the closed state (ON), in at least one of P relay 11 or N relay 12. The stuck OFF diagnosis method is performed after the stuck ON diagnosis method.

In this embodiment, the stuck ON diagnosis method will be described, and the stuck OFF diagnosis method will be described in a modification described below.

Although not illustrated, sticking diagnosis apparatus 100 includes as hardware, a central processing unit (CPU), a read-only memory (ROM) that stores a computer program, and a random access memory (RAM) that is a work memory. The functions of sticking diagnosis apparatus 100 described below are implemented by the CPU loading the computer program from the ROM to the RAM and executing the computer program. For example, sticking diagnosis apparatus 100 is implemented as an electronic control unit (ECU). Note that sticking diagnosis apparatus 100 may be provided inside battery pack 1 or provided outside battery pack 1.

As illustrated in FIG. 2, sticking diagnosis apparatus 100 includes obtaining section 110 and determination section 120.

Obtaining section 110 obtains detected voltages Va, Vb, and Vc from voltmeters 15, 16, and 17 respectively before both P relay 11 and N relay 12 are turned ON (in other words, before the battery starts).

Obtaining section 110 sets a first threshold and a second threshold on the basis of detected voltage Vc.

Specifically, obtaining section 110 calculates the value of a specific percentage (for example, 95%) of detected voltage Vc and sets the value as the first threshold. Obtaining section 110 calculates the value of a specific percentage (for example, 50%) of detected voltage Vc and sets the value as the second threshold. It is assumed that the specific percentages are determined in advance. While an example case where the first threshold and the second threshold are set on the basis of detected voltage Vc has been described above, the first threshold and the second threshold are not limited to this. For example, as the first threshold and the second threshold, voltage values set in advance may be used.

Determination section 120 compares detected voltage Va with the first threshold and determines the presence or absence of the stuck ON state in P relay 11 on the basis of the result of comparison.

Specifically, determination section 120 determines whether detected voltage Va is higher than or equal to the first threshold. When detected voltage Va is higher than or equal to the first threshold, determination section 120 determines that the stuck ON state is occurring in P relay 11. On the other hand, when detected voltage Va is lower than the first threshold, determination section 120 determines that the stuck ON state is not occurring in P relay 11.

Determination section 120 compares detected voltage Vb with the second threshold and determines the presence or absence of the stuck ON state in N relay 12 on the basis of the result of comparison.

Specifically, determination section 120 determines whether detected voltage Vb is lower than or equal to the second threshold. When detected voltage Vb is lower than or equal to the second threshold, determination section 120 determines that the stuck ON state is occurring in N relay 12. On the other hand, when detected voltage Vb is higher than the second threshold, determination section 120 determines that the stuck ON state is not occurring in N relay 12.

Determination section 120 stores the results of determinations described above, that is, the presence or absence of the stuck ON state in each of P relay 11 and N relay 12, in a storage section (not illustrated). Note that the storage section may be provided inside sticking diagnosis apparatus 100 or provided outside sticking diagnosis apparatus 100.

Determination section 120 may read the results of determinations from the storage section at a specific timing and output (transmit) information indicating the results of determinations to a specific apparatus (not illustrated). In this case, the specific apparatus may output the results of determinations.

Examples of the specific apparatus include a notification device (for example, a lamp, a display, or a speaker) mounted in the vehicle or a computer (for example, a terminal apparatus available to a mechanic or a server on a network) installed outside the vehicle. For example, the results of determinations output to a display or a computer may be codes that are combinations of numbers and alphabetical letters.

The configuration of sticking diagnosis apparatus 100 has been described above.

Figure 3:
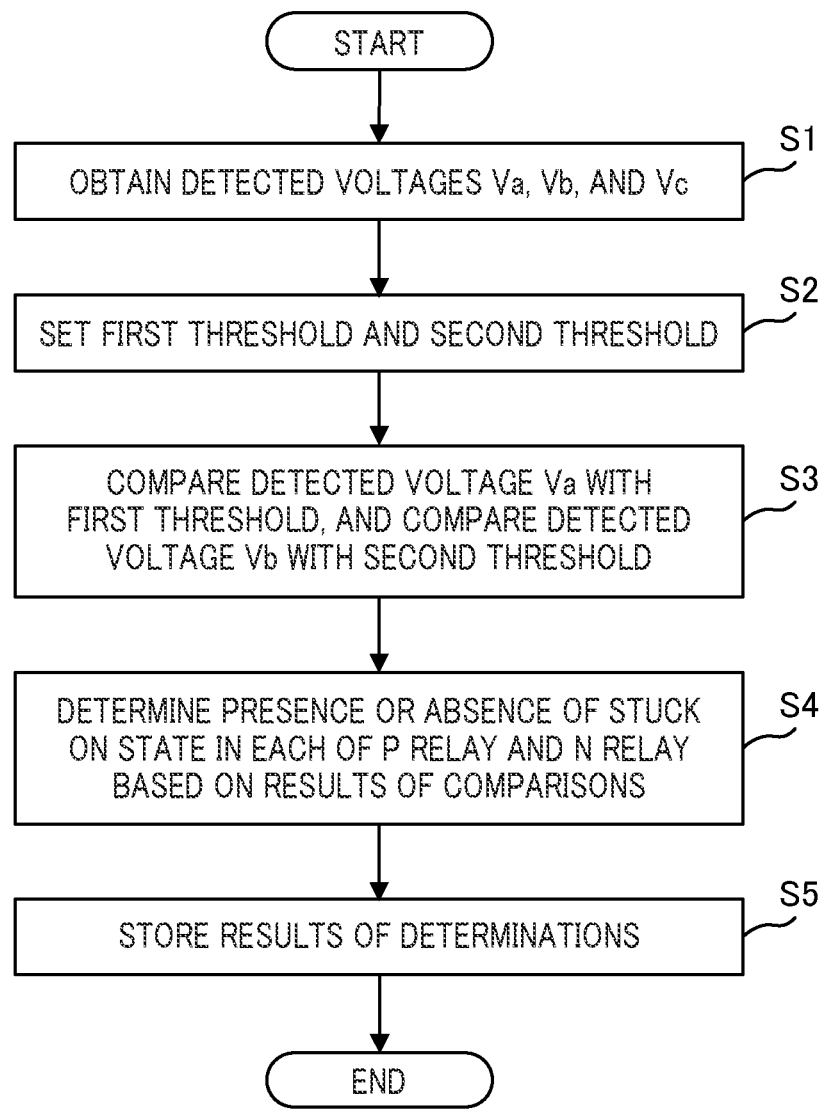
FIG. 3 is a flowchart illustrating a flow of a stuck ON diagnosis method according to the embodiment of the present disclosure.

Next, a flow of the stuck ON diagnosis method performed by sticking diagnosis apparatus 100 will be described with reference to FIG. 3. FIG. 3 is a flowchart illustrating a flow of the stuck ON diagnosis method.

The flow illustrated in FIG. 3 is started, for example, before both P relay 11 and N relay 12 are turned ON.

First, obtaining section 110 obtains detected voltages Va, Vb, and Vc from voltmeters 15, 16, and 17 respectively (step S1).

Next, obtaining section 110 sets the first threshold and the second threshold on the basis of detected voltage Vc (step S2).

Next, determination section 120 compares detected voltage Va with the first threshold and compares detected voltage Vb with the second threshold (step S3).

Specifically, determination section 120 determines whether detected voltage Va is higher than or equal to the first threshold and determines whether detected voltage Vb is lower than or equal to the second threshold.

Next, determination section 120 determines the presence or absence of the stuck ON state in each of P relay 11 and N relay 12 on the basis of the results of comparisons in step S3 (step S4).

Specifically, determination section 120 determines when detected voltage Va is higher than or equal to the first threshold, that the stuck ON state is occurring in P relay 11, and determines when detected voltage Va is lower than the first threshold, that the stuck ON state is not occurring in P relay 11.

Specifically, determination section 120 determines when detected voltage Vb is lower than or equal to the second threshold, that the stuck ON state is occurring in N relay 12, and determines when detected voltage Vb is higher than the second threshold, that the stuck ON state is not occurring in N relay 12.

Next, determination section 120 stores the results of determinations (the presence or absence of the stuck ON state in each of P relay 11 and N relay 12) in the specific storage section (step S5).

Thereafter, determination section 120 may read the results of determinations from the storage section at a specific timing and output (transmit) information indicating the results of determinations to the specific apparatus.

The flow of the stuck ON diagnosis method has been described above.

While an example case where the stuck ON diagnosis method is performed before both P relay 11 and N relay 12 are turned ON has been described in this embodiment, the stuck ON diagnosis method is not limited to this. The stuck ON diagnosis method may be performed when both P relay 11 and N relay 12 are turned ON (in other words, the battery starts), and thereafter, are temporarily turned OFF (for example, when the vehicle starts traveling, and thereafter, makes a brief stop).

As described above, sticking diagnosis apparatus 100 of this embodiment is an apparatus for diagnosing the presence or absence of sticking at P relay 11 that is connected to the positive electrode of battery 10 and at N relay 12 that is connected to the negative electrode of battery 10, the apparatus including: obtaining section 110 that obtains, before both the contact of P relay 11 and the contact of N relay 12 are put in the closed state, detected voltage Va that is the value of the voltage between a point downstream of P relay 11 and a point upstream of N relay 12 and detected voltage Vb that is the value of the voltage of resistor 14 provided in parallel to N relay 12; and determination section 120 that when detected voltage Va is higher than or equal to the first threshold, determines that P relay 11 is in the stuck ON state in which the contact of P relay 11 remains in the closed state and is not capable of transitioning to transition to the open state, and when detected voltage Vb is lower than or equal to the second threshold, determines that N relay 12 is in the stuck ON state in which the contact of N relay 12 remains in the closed state and is un to transition to the open state.

With the characteristics described above, a switching operation of alternately turning the P relay and the N relay ON and OFF as in the method in the related art described above need not be performed, and therefore, a diagnosis of sticking of relays (hereinafter also simply referred to as "diagnosis") can be quickly started, and the time taken to make the diagnosis can be reduced. As a result, the vehicle (for example, an electric car) can be quickly started.

Specifically, when the method in the related art is applied to a configuration in which a plurality of battery packs 1 are connected in parallel, a diagnosis of the plurality of battery packs 1 is made one by one sequentially, and this takes time. When a diagnosis of the plurality of battery packs 1 is simultaneously made, another diagnosis for identifying battery pack 1 in which sticking occurred needs to be made, and this takes time. That is, the method in the related art is not suitable for a configuration in which a plurality of battery packs 1 are connected in parallel.

In contrast, with sticking diagnosis apparatus 100 of this embodiment, a diagnosis can be started without operating P relay 11 or N relay 12, and therefore, as the number of battery packs 1 connected in parallel increases, a more significant time saving effect can be attained.

In sticking diagnosis apparatus 100 of this embodiment, a switching operation of alternately turning the P relay and the N relay ON and OFF as in the method in the related art described above need not be performed, and therefore, power consumption in the switching operation can be reduced, and power saving can be attained.

Note that the present disclosure is not limited to the description in the above-described embodiment, and various modifications can be made without departing from the spirit thereof. A modification will be described below.

For example, sticking diagnosis apparatus 100 may perform the stuck OFF diagnosis method after performing the stuck ON diagnosis method described above (after both the contact of P relay 11 and the contact of N relay 12 are put in the closed state). As described above, the stuck OFF diagnosis method is a method for diagnosing the occurrence of the stuck OFF state (a state in which the contact remains in the open state and is not capable of transitioning to the closed state), in at least one of P relay 11 or N relay 12.

Figure 4:
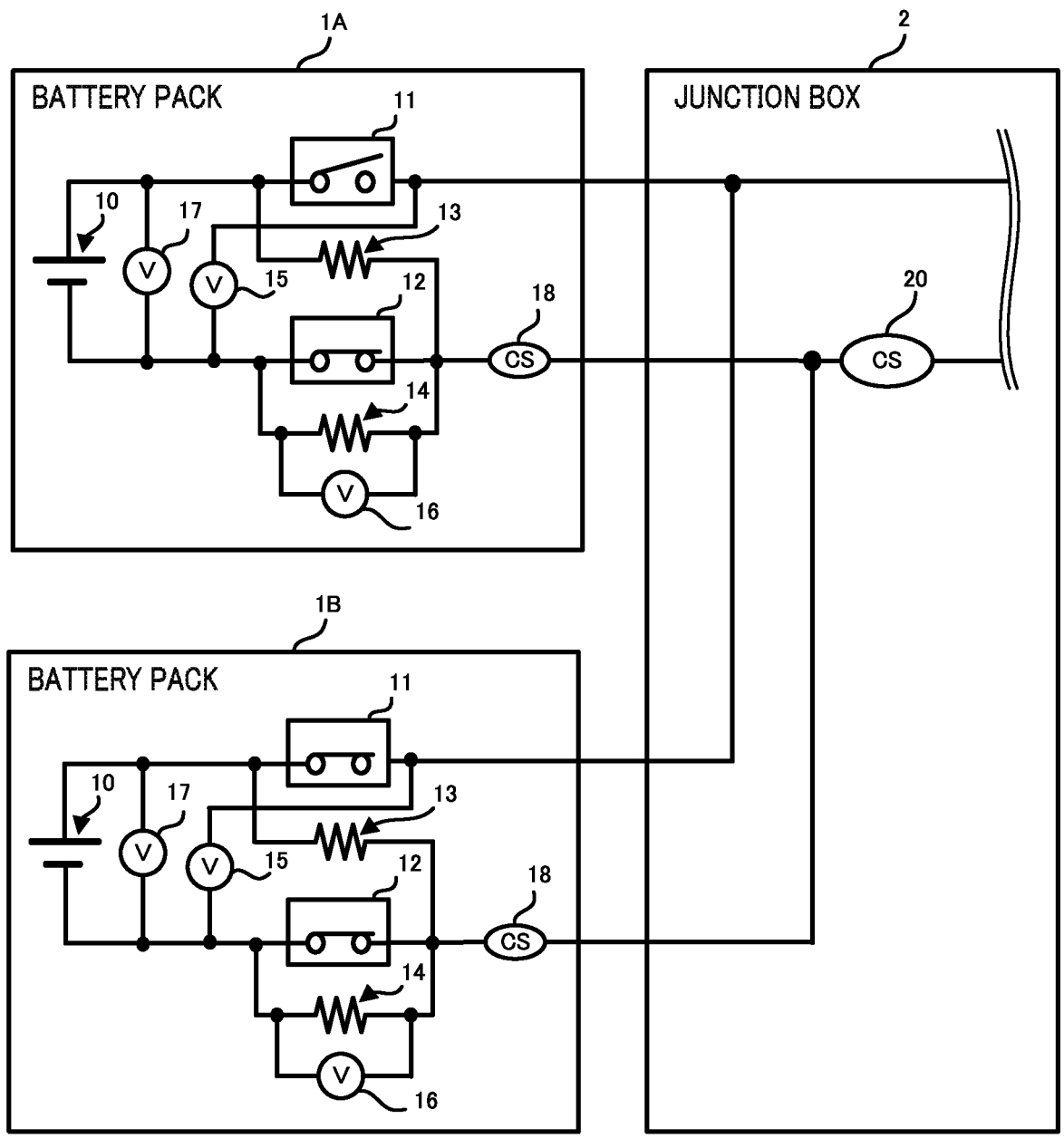
FIG. 4 is a schematic diagram illustrating a configuration of battery packs according to a modification of the present disclosure.
Figure 5:
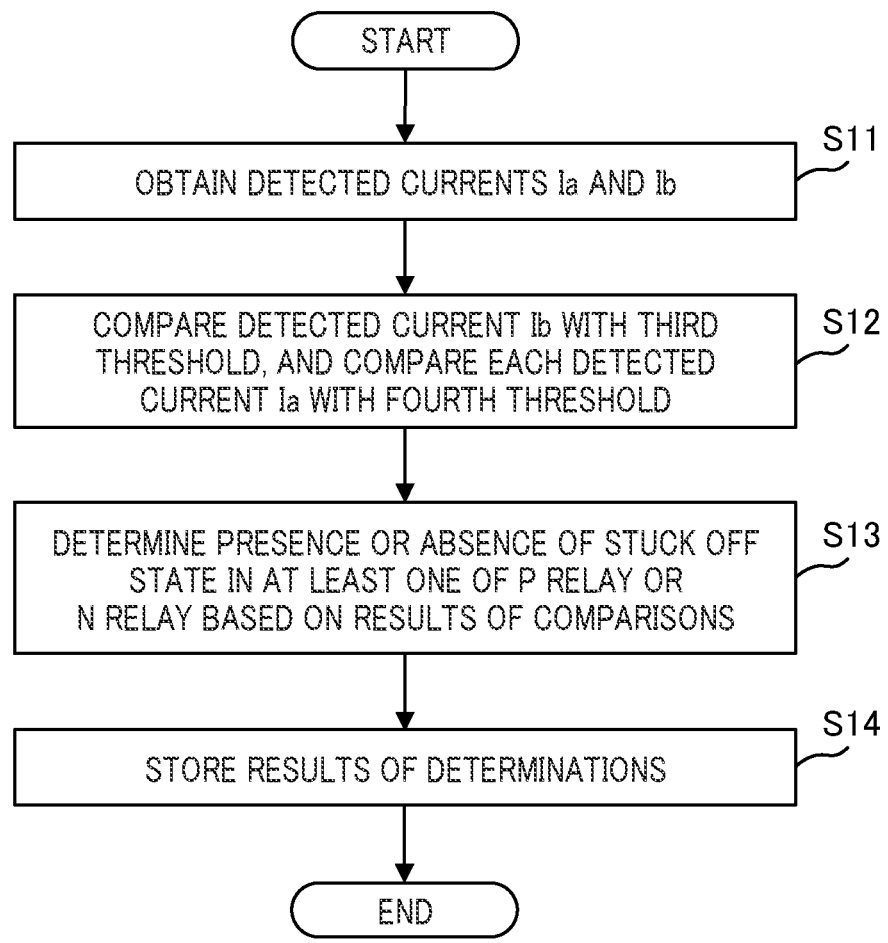
FIG. 5 is a flowchart illustrating a flow of a stuck OFF diagnosis method according to the modification of the present disclosure.

A specific example of the stuck OFF diagnosis method will be described below with reference to FIG. 4 and FIG. 5. FIG. 4 is a schematic diagram illustrating a configuration of battery packs 1 according to this modification. FIG. 5 is a flowchart illustrating a flow of the stuck OFF diagnosis method according to this modification.

In this modification, as illustrated in FIG. 4, an example case where two battery packs 1A and 1B are connected in parallel by junction box 2 will be described. Battery packs 1A and 1B have a configuration the same as that of battery pack 1 illustrated in FIG. 1, and therefore, a description thereof is omitted here.

First, obtaining section 110 obtains detected current Ia from current sensor 18 of each of battery packs 1A an 1B and obtains detected current Ib from current sensor 20 of junction box 2 (step S11).

It is assumed that obtaining section 110 and determination section 120 can identify a battery pack from which detected current Ia is obtained (that is, can determine, for each detected current Ia, whether the detected current Ia is obtained from battery pack 1A or obtained from battery pack 1B).

Next, determination section 120 compares detected current Ib with a third threshold and compares each detected current Ia with a fourth threshold (step S12).

The third threshold and the fourth threshold are respectively, for example, the value (absolute value) of the current flowing through junction box 2 and the value (absolute value) of the current flowing through battery pack 1A (1B) while the stuck OFF state is not occurring. For example, the fourth threshold is a value smaller than the third threshold and is set in accordance with the number of battery packs.

Next, determination section 120 determines the presence or absence of the stuck OFF state in at least one of P relay 11 or N relay 12 on the basis of the results of comparisons in step S12 (step S13).

Specifically, when detected current Ib is greater than the third threshold and detected current Ia is less than the fourth threshold, determination section 120 determines that the stuck OFF state is occurring in at least one of P relay 11 or N relay 12 of a battery pack from which the detected current Ia is obtained.

Next, determination section 120 stores the results of determinations (the presence or absence of the stuck OFF state in each of battery packs 1A and 1B) in the specific storage section (step S14).

Thereafter, determination section 120 may read the results of determinations from the storage section at a specific timing and output (transmit) information indicating the results of determinations to the specific apparatus.

With the stuck OFF diagnosis method described above, the stuck OFF state can be detected with a higher accuracy than in a diagnosis using voltage values. For example, a case is assumed where the stuck OFF state occurs in P relay 11 of battery pack 1A as illustrated in FIG. 4 during traveling of the vehicle. In this case, as long as P relay 11 and N relay 12 in battery pack 1B are normal (both are turned ON) as illustrated in FIG. 4, the voltage values are normally detected in battery pack 1A. Therefore, with a stuck OFF diagnosis method based on voltage values, the occurrence of the stuck OFF state in battery pack 1A cannot be detected. In contrast, in this modification, the presence or absence of the stuck OFF state is determined by using not voltage values but current values, and therefore, this improves the accuracy of diagnosis.

While an example case where the number of battery packs 1 connected in parallel is two has been described in this modification, the number of battery packs 1 connected in parallel is not limited to this. The stuck OFF diagnosis method is also applicable to a case where three or more battery packs 1 are connected in parallel.

The sticking diagnosis apparatus and the sticking diagnosis method of the present disclosure is useful as a general technique for diagnosing the presence or absence of sticking at relays that are connected to a battery.

The invention claimed is:

1. A sticking diagnosis apparatus for a battery pack having a battery, a positive electrode relay that is connected to a positive-electrode of the battery and a negative-electrode relay that is connected to a negative-electrode of the battery, and for diagnosing a presence or absence of sticking at the positive-electrode relay and at the negative-electrode relay of the battery pack, the sticking diagnosis apparatus comprising:
   a central processing unit;
      that obtains, when starting the battery pack, before both a contact of the positive-electrode relay and a contact of the negative-electrode relay are operated to a closed state, a first voltage value from a first voltmeter that detects a value of a voltage between a point downstream of the positive-electrode relay and a point upstream of the negative-electrode relay and a second voltage value from a second voltmeter that detects a value of a voltage between a point downstream of the negative-electrode relay and a point upstream of the negative-electrode relay; and
      that in a case where the first voltage value is greater than or equal to a first threshold, determines that the sticking in a state of ON has occurred in the contact of the positive-electrode relay, and in a case where the second voltage value is less than or equal to a second threshold, determines that the sticking in a state of ON has occurred in the contact of the negative-electrode relay,
   wherein the central processing unit is configured to output the determination result regarding the presence or absence of the sticking in the battery pack to a notification device or a computer,
   wherein the first voltmeter and the second voltmeter are built into the battery pack, and
   wherein the central processing unit determines whether the sticking in the state of ON has occurred in the positive-electrode relay and the negative-electrode relay without operating the positive-electrode relay and the negative-electrode relay.

2. The sticking diagnosis apparatus according to claim 1,
   wherein the central processing unit further obtains, when starting the battery pack, before both the contact of the positive-electrode relay and the contact of the negative-electrode relay are operated to the closed state, a third voltage value from a third voltmeter that detects a value of a voltage of the battery, and
   the central processing unit calculates the first threshold and the second threshold based on the third voltage value,
   wherein the third voltmeter is built into the battery pack.

3. The sticking diagnosis apparatus according to claim 1, for diagnosing a presence or absence of the sticking of a plurality of the battery packs each, the plurality of battery packs being connected in parallel to a load side.

4. The sticking diagnosis apparatus according to claim 3,
   wherein the central processing unit obtains, when starting the plurality of the battery pack, after both the contact of the positive-electrode relay and the contact of the negative-electrode relay of the plurality of the battery pack are operated to the closed state, first current values from first current sensors that detect values of currents respectively flowing inside the plurality of the battery packs and a second current value from a second current sensor that detects a value of a current flowing outside the plurality of the battery packs, and
   compares the second current value with a third threshold and compares each of the first current values with a fourth threshold, and
   in a case where the second current value is greater than the third threshold and a first current value among the first current values is less than the fourth threshold, the central processing unit determines that the sticking in a state of OFF has occurred in the contact of at least one of the positive-electrode relay and/or the negative-electrode relay of the battery pack among the plurality of the battery packs, from which the first current value is obtained,
   wherein the first current sensors are built into the plurality of the battery pack respectively.

5. A sticking diagnosis method performed by a computer for a battery pack having a battery, a positive electrode relay that is connected to a positive-electrode of the battery and a negative-electrode relay that is connected to a negative-electrode of the battery, and for diagnosing a presence or absence of sticking at the positive-electrode relay and at the negative-electrode relay of the battery pack, the sticking diagnosis method comprising:
   obtaining, when starting the battery pack, before both a contact of the positive-electrode relay and a contact of the negative-electrode relay are operated to a closed state, a first voltage value from a first voltmeter that detects a value of a voltage between a point downstream of the positive-electrode relay and a point upstream of the negative-electrode relay and a second voltage value from a second voltmeter that detects a value of a voltage between a point downstream of the negative-electrode relay and a point upstream of the negative-electrode relay;

determining in a case where the first voltage value is greater than or equal to a first threshold, that the sticking in a state of ON has occurred in the contact of the positive-electrode relay, and determining in a case where the second voltage value is less than or equal to a second threshold, that the sticking in a state of ON has occurred in the contact of the negative-electrode relay; and outputting the determination result regarding the presence or absence of the sticking in the battery pack to a notification device or a computer, wherein the first voltmeter and the second voltmeter are built into the battery pack, and wherein the determining process is performed without operating the positive-electrode relay and the negative-electrode relay.

* * * * *